Aug. 18, 1931.  J. R. CAUTLEY  1,819,767

CONTROL MECHANISM FOR VEHICLE WHEEL BRAKES

Original Filed March 11, 1924

INVENTOR
John R. Cautley

BY A. D. T. Libby
ATTORNEY

Patented Aug. 18, 1931

1,819,767

UNITED STATES PATENT OFFICE

JOHN RANDOLPH CAUTLEY, OF SOUTH BEND, INDIANA, ASSIGNOR, BY MESNE ASSIGNMENTS, TO BENDIX BRAKE COMPANY, OF CHICAGO, ILLINOIS, A CORPORATION OF ILLINOIS

CONTROL MECHANISM FOR VEHICLE WHEEL BRAKES

Application filed March 11, 1924, Serial No. 698,465. Renewed December 26, 1930.

This invention relates to a control mechanism for vehicle wheel brakes and is particularly adapted for use in connection with brakes on the front or steering wheels. In steering wheel brakes of the mechanical type a universal joint is provided between the control shaft and the camshaft, or the member which actuates the braking members, the other end of the control shaft being supported on a non-rotating part of the vehicle, such as the frame of the chassis. This support must have certain freedom of movement both oscillatory and sliding, in order to move with the body of the chassis with respect to the wheels.

It is, therefore, one of the objects of my invention to provide a control mechanism which will readily and efficiently respond to the movements of the wheel and the chassis, yet a mechanism which is light in weight, but very strong.

Another object of my invention is to provide a control mechanism which is quite simple in construction and, therefore, easy to manufacture.

Other objects will be apparent to one skilled in this art after a study of the specification taken in connection with the annexed drawings; wherein.

Figure 1:
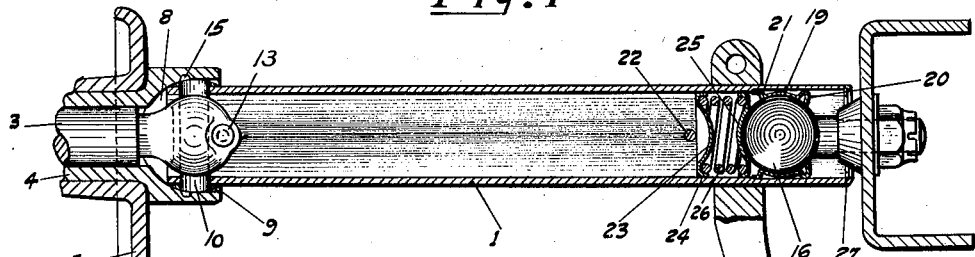
Figure 1 is a sectional view showing one form of my control mechanism connected between the chassis and a section of the wheel.
Figure 3:
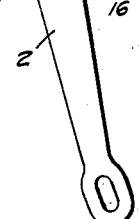
Figure 3 is a top view of Fig. 2.
Figure 2:
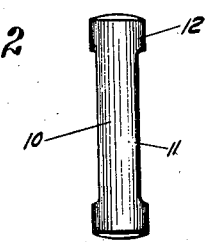
Figure 2 is an enlarged view of the pin used in the universal joint at the wheel end.

Referring now to the details wherein like numbers refer to corresponding parts in the various views 1, is a control shaft having a lever 2 for actuating it, which lever is connected to the brake pedal in some well-known manner. 3 illustrates the end of a brake actuating shaft positioned in a support member 4 carried by a member 5, which in turn is usually supported by the wheel spindle. The end of the actuating shaft 3 terminates preferably in a somewhat enlarged portion 6 which is slotted at 7. The support 4 has a spherical seat 8 formed therein and the end of the control shaft 1 extends within the confines of this seat. A bearing member 9 having its outer surface spherically formed to fit the seat 8 is positioned over the end of the shaft 1 and a pin 10, having at least one side flatted, indicated at 11, is positioned in the slot 7 and two ends 12 of the pin are circular in shape and pass through and rest in the end of the hollow control shaft 1 and the bearing member 9. The pin 10 is normally held in the slot 7 due to the pressure of spring 26, which urges hollow shaft 1 lengthwise toward the left in the drawing. However, an additional retaining device may be employed as illustrated by the bolt 13, which may or may not be used as seems desirable. When the bolt 13 is used, it may be passed through the hole 14 in the end of the shaft 1, which may be later plugged. It will be seen that oscillatory movement of the shaft 1 is obtained around the ends 12 of the pin 10 and a turning motion of the wheel is provided by the pin moving in the slot 7. A recess 15 is provided in the spherical seat 8 to receive felt or a cork facing to retain lubricant within the joint and to assist in keeping out dust or dirt.

The other end of the hollow shaft 1 is supported through the medium of a ball member 16 carried on a stud 17 fastened to the side member 18 of the chassis. In order to increase the wearing area of the ball in the tubular shaft and to assist in preventing rattle, a light metal stamping is formed to have an arcuate surface 19 engage the sphere over a segment of its surface. One edge of the said stamping is formed to produce an annular chamber 20 for packing, while the other edge is formed into a rim making yielding contact with the inner surface of the tubular shaft 1. The ball end of the tubular shaft as indicated is counterbored and has an interior diameter slightly larger than the interior diameter of the central part of the control shaft for the purpose of positioning the ball seating member as described. A pin 22 passing through the shaft 1 acts as a stop for the member 23, which is formed so as to have an annular flange 24 fitting closely the interior diameter of the shaft 1. Another member 25 is exactly like 23, but is placed so that its arcuate surface rests against the ball 16. Positioned between the members 23 and 25 is a spring 26 that exerts its pressure against the ball. Since the flanges 24 of the members 23 and 25 closely engage the inner surface of the shaft 1, a chamber is formed which may be packed with lubricant for easing the action of member 25 as it moves back and forth in the tube responsive to movements of the body of the vehicle. The outer end of the tubular shaft 1 is provided with a retaining means in the form of snap ring 27 to prevent the tube from being pulled off from the ball.

Figure 4:
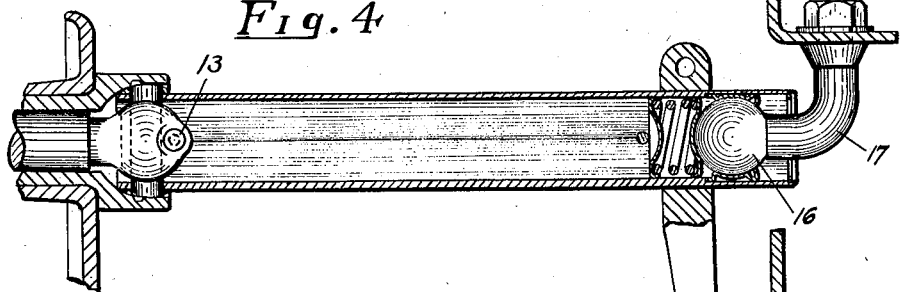
Figure 4 is similar to Fig. 1, but with a slightly different arrangement at the chassis or support end of the control shaft.
Figure 5:
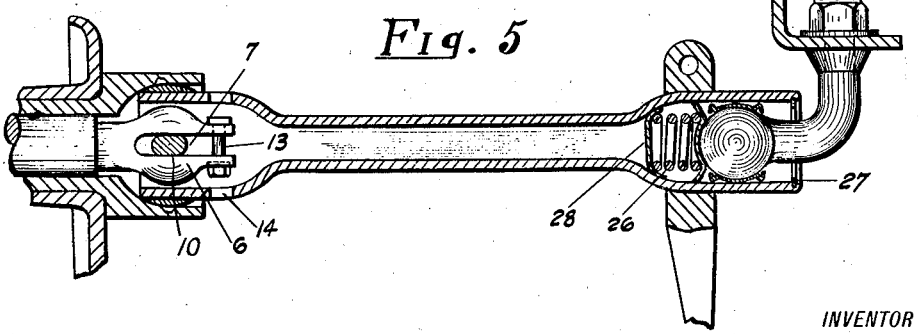
Figure 5 shows a modified form of control shaft and a slightly different support means at the chassis end. The brake actuating shaft is shown at 90 degrees from its position in Figs. 1 and 4.

In the form shown in Fig. 5 the control shaft is made of a tube of considerably smaller diameter through the most of its length than in the form shown in Figs. 1 and 4, the ends being expanded as indicated to take the universal joint at one end and the ball swivel at the other end. In this figure the stop instead of being formed with a pin is in the nature of a cupped washer 28, which finds a seat at the point where the tube is expanded. The seat member for the ball is also somewhat differently constructed than in the form shown in Figs. 1 and 4, but these changes merely indicate that the details entering into the construction may be changed without departing from the spirit of my invention and the scope of the appended claims.

Having thus described my invention, what I claim is:

1. In a control mechanism for vehicle wheel brakes, a brake actuating shaft and a support therefor, said support having a spherical seat therein, and said shaft having a slotted end, a control shaft having one end entering the confines of said spherical seat and over the slotted end of said actuating shaft, a bearing member fitting over said end of the control shaft and spherically formed to fit said seat, a pin nonrotatably held in the slotted end of the actuating shaft and having its ends passing through the control shaft and bearing member, said control shaft being rotatable about said pin ends, and means for actuating the control shaft.

2. In a control mechanism for vehicle wheel brakes, a brake actuating shaft and a support therefor, said support having a spherical seat therein, and said shaft having an enlarged slotted end, a hollow control shaft having one end entering the confines of said spherical seat and over the slotted end of said actuating shaft, a bearing member fitting over said end of the control shaft and spherically formed to fit said seat, a pin having at least one flat side intermediate circular ends, said flat portion of the pin lying within said slot with means for preventing its moving out of the slot, and the circular ends passing through and positioned in the end of the control shaft and bearing member, and means for actuating the control shaft.

3. In a control mechanism for vehicle wheel brakes, a brake actuating shaft and a support therefor, said support having a spherical seat therein, and said shaft having an enlarged slotted end, a hollow control shaft having one end entering the confines of said spherical seat and over the slotted end of said actuating shaft, a bearing member fitting over said end of the control shaft and spherically formed to fit said seat, a pin having at least one flat side intermediate circular ends, said flat portion of the pin being positioned in said slot and a bolt passing through said slotted end to prevent the pin from moving out of the slot, with means for assembly thereof, said circular pin ends passing through and positioned in the end of the control shaft and bearing member.

4. In a control mechanism for vehicle wheel brakes, a brake actuating shaft and a support therefor, said support having a spherical seat therein, and said shaft having a slotted end, a hollow control shaft having expanded ends and having one end entering the confines of said spherical seat and over the slotted end of said actuating shaft, a bearing member fitting over said end of the control shaft and spherically formed to fit said seat, a pin positioned in said slot and means for preventing its rotation therein and further means for preventing its moving out of the slot, said pin having circular ends passing through and positioned in the end of the control shaft and bearing member, and means for actuating the control shaft.

5. In a control mechanism for vehicle wheel brakes, a brake actuating shaft and a support therefor, said support having a spherical seat therein, and said shaft having a slotted end, a hollow control shaft having one end entering the confines of said spherical seat and over the slotted end of said actuating shaft, a bearing member fitting over said end of the control shaft and spherically formed to fit said seat, a pin positioned in said slot and means for preventing its rotation therein and further means for preventing its moving out of the slot, said pin having circular ends passing through and positioned in the end of the control shaft and bearing member, and means for actuating the control shaft.

6. In a control mechanism for vehicle wheel brakes, a hollow control shaft, a support for the end of the control shaft comprising a ball and slip joint consisting of; a ball member fastened to a non-rotating support and projecting within the hollow shaft end, a member having an arcuate surface fitting within the shaft and over a part of the ball surface near its central vertical plane, an arcuately formed member engaging the ball on its horizontal diameter, a stop within the control shaft, and a spring positioned between the stop and the last mentioned arcuately formed member.

7. In a control mechanism for vehicle wheel brakes, a hollow control shaft, a support for the end of the control shaft comprising a ball and slip joint consisting of; a ball member fastened to a non-rotating support and projecting within the hollow shaft end, a member having an arcuate surface fitting within the shaft and over a part of the ball surface near its central vertical plane, a member having an annular flange to fit the tube and a portion curved to fit the ball, a stop within the control shaft, a second flanged member similar to the one just mentioned resting against said stop, and a spring between said two flanged members.

8. In a control mechanism for vehicle wheel brakes, a hollow control shaft, a support for the end of the control shaft comprising a ball and slip joint consisting of; a ball member fastened to a non-rotating support and projecting within the hollow shaft end, a member having an arcuate surface fitting within the shaft and over a part of the ball surface near its central vertical plane, an arcuately formed member engaging the ball on its horizontal diameter, a stop within the control shaft, a spring positioned between the stop and the last mentioned arcuately formed member, and a retaining device in the end of the control shaft to prevent it being pulled off the ball.

9. In a control mechanism for vehicle wheel brakes, a hollow control shaft, a support for the end of the control shaft comprising a ball and slip joint consisting of; a ball member fastened to a non-rotating support and projecting within the hollow shaft end, a member having an arcuate surface fitting over a part of the ball and having an edge formed to produce an annular packing chamber on the surface of the ball, two similar members each having an annular flange to fit the hollow shaft, a stop, one of said two similar members resting against the stop and the other against the ball, a resilient member between said two similar members, and a retaining device in the control shaft end.

10. In a control mechanism for vehicle wheel brakes, a hollow control shaft, a support for the end of the control shaft comprising a ball and slip joint consisting of; a ball member fastened to a non-rotating support and projecting within the hollow shaft end, a slip member having an arcuate surface to engage an annular segment of the ball and also having one rim to form a packing chamber on the ball surface and the other rim to yieldingly engage the inner surface of the control shaft, two members having flanges closely fitting the inner surface of the control shaft, thereby forming a lubricant chamber, a stop, one of the said two members engaging said stop, the other fitting over a part of the ball, a spring between said two members, and retaining means in the end of said control shaft.

11. In a control mechanism for vehicle wheel brakes, a hollow control shaft, a support for the end of the control shaft comprising a ball and slip joint consisting of; a ball member fastened to a non-rotating support and projecting within the hollow shaft end, means for increasing the wearing area of the ball and for preventing rattling comprising a slip member between the ball and shaft yieldingly engaging the shaft and having an arcuate surface to engage an annular segment of the ball, means for applying pressure to the ball comprising; a stop in the shaft, a member resting against the stop, a member fitting over a portion of the ball toward the stop, a spring between said last two mentioned members and a retaining device in the end of said control shaft.

12. In a control mechanism for vehicle wheel brakes, a brake-actuating shaft swivelling with the wheel and an adjacent non-swivelling shaft arranged end to end, one of the shafts having a slotted rounded end and the other having its end hollow to receive the slotted end of the first, and a pin carried by the hollow shaft end and crossing it diametrically and passing through said slotted shaft end to transmit torque thereto, in combination with a bearing for the swivelling shaft extended at its end as a seat encircling the jointed ends of the shafts and confining the pin in place.

13. In a control mechanism for vehicle front wheel brakes, a brake-applying device arranged to be supported at the wheel, a shaft having one end arranged to be movably supported by the vehicle, a universal joint connecting the shaft and said device, and a spring arranged to urge the shaft lengthwise toward said joint.

14. In a control mechanism for vehicle front wheel brakes, a brake-applying device arranged to be supported at the wheel, a shaft having one end arranged to be movably supported by the vehicle, a universal joint connecting the shaft and said device, and a spring adjacent the movably-supported end of the shaft and arranged to urge the shaft lengthwise toward said joint.

15. A braking mechanism for the steering wheels of vehicles comprising: a brake drum, brake segments adapted to be brought into contact with said brake drum, a control key between said segments adapted to bring said segments against said brake drum, a rigid control rod, co-operating means formed on adjacent ends of said control key and said control rod and constituting a universal joint whereby said control rod bears loosely against said control key and is adapted to rotate said control key, and yielding means bearing against the other end of said control rod and adapted to urge said control rod towards the brake drum, whereby a permanent contact is maintained between said key and said control rod.

16. In a control mechanism for vehicle wheel brakes, a hollow control shaft, a support for the end of the control shaft comprising a ball and slip joint consisting of: a ball member fastened to a non-rotating support and projecting within the hollow shaft end, said end having a portion of larger diameter than the central portion of the shaft, a stop member within the shaft end engaging the small diameter portion, an arcuately formed member engaging the ball on its horizontal diameter, a spring positioned between the stop member and the arcuately formed member, and retaining means in the end of the control shaft to prevent it from being pulled off the ball.

17. In a control mechanism for vehicle wheel brakes, a hollow control shaft, a support for the end of the control shaft comprising a ball and slip joint consisting of: a ball member fastened to a non-rotating support and projecting within the hollow shaft end, said end having a counterbore of larger diameter than the central portion of the shaft, a member having an arcuate surface fitting over a part of the ball surface and having a rim shaped to engage the shoulder formed by the counterbore, two spaced members within the larger diameter of the hollow shaft, a stop, one of said two spaced members resting against the stop and the other against the ball, a resilient member between said two spaced members, and a retaining device in the control shaft end.

18. In a control mechanism for a swiveled wheel vehicle brake, a brake applying device arranged to be supported at the wheel, a shaft having one end arranged to be movably supported by the vehicle, a universal joint connecting the shaft and said device, and means adjacent the vehicle end of the shaft arranged to urge the shaft toward the joint.

19. In a control mechanism for a swiveled wheel vehicle brake, a brake applying device on the wheel, a hollow shaft having universal joint connections with the vehicle and device, and means urging the shaft toward the device.

20. In a control mechanism for a swiveled wheel vehicle brake, a brake applying device on the wheel, a hollow shaft having universal joint connections with the vehicle and device and a spring within the shaft urging the shaft toward the device.

In testimony whereof, I affix my signature.
JOHN RANDOLPH CAUTLEY.